United States Patent
Nakayama

(10) Patent No.: US 8,023,749 B2
(45) Date of Patent: Sep. 20, 2011

(54) IMAGE COMPRESSING APPARATUS AND IMAGE READING APPARATUS INCLUDING THE SAME, IMAGE PROCESSING APPARATUS INCLUDING IMAGE COMPRESSING APPARATUS AND IMAGE FORMING APPARATUS INCLUDING THE SAME, IMAGE COMPRESSION PROCESSING METHOD, COMPUTER PROGRAM THEREOF, AND RECORDING MEDIUM

(75) Inventor: Yuri Nakayama, Higashi-Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 1126 days.

(21) Appl. No.: 11/812,385

(22) Filed: Jun. 18, 2007

(65) Prior Publication Data

US 2007/0292036 A1    Dec. 20, 2007

(30) Foreign Application Priority Data

Jun. 19, 2006 (JP) ................................ 2006-169013

(51) Int. Cl.
  *G06K 9/36* (2006.01)
  *H04N 5/76* (2006.01)
  *H04B 1/66* (2006.01)

(52) U.S. Cl. ....................... 382/232; 348/231.2; 375/240

(58) Field of Classification Search .................. 382/232, 382/233–253; 348/231.2; 375/240–241
See application file for complete search history.

(56) References Cited

U.S. PATENT DOCUMENTS

| | | | | |
|---|---|---|---|---|
| 5,535,013 A | * | 7/1996 | Murata | 382/239 |
| 6,097,845 A | * | 8/2000 | Ng et al. | 382/239 |
| 6,163,625 A | * | 12/2000 | Ng et al. | 382/239 |
| 6,486,981 B1 | | 11/2002 | Shimura et al. | |

FOREIGN PATENT DOCUMENTS

| | | |
|---|---|---|
| JP | 7-46410 A | 2/1995 |
| JP | 07-087332 | 3/1995 |
| JP | 7-87332 A | 3/1995 |
| JP | 2000-350037 A | 12/2000 |
| JP | 2002-247373 A | 8/2002 |
| JP | 2004-120135 A | 4/2004 |
| JP | 2005-094182 | 4/2005 |
| JP | 2005-94182 A | 4/2005 |

OTHER PUBLICATIONS

Gregory K. Wallace, "The JPEG Still PIcture Compression Standard", Feb. 1992, IEEE Transactions on Consumer Electronics, vol. 38, Issue: 1, pp. xviii-xxxiv.*

* cited by examiner

*Primary Examiner* — Aaron W Carter
(74) *Attorney, Agent, or Firm* — Birch, Stewart, Kolasch & Birch, LLP

(57) ABSTRACT

An image compressing apparatus and method are provided that execute an appropriate JPEG compression process in accordance with a document type of image data to realize maintenance of good image quality and improvement of a compression rate at the same time. Document image data input from an image input apparatus are converted into digital signals by an image compressing apparatus and delivered to a JPEG compression section and a document discrimination section. The document discrimination section discriminates a document type for each page and the parameter setting section calculates optimum compression parameters (a quantization table and a subsampling) in accordance with a document discrimination signal from the document discrimination section. The JPEG compression section executes the JPEG compression process with the use of the parameters from the parameter setting section to output a JPEG code along with encoded data.

10 Claims, 12 Drawing Sheets

FIG.8

| DOCUMENT DISCRIMINATION SIGNAL | SUBSAMPLING | QUANTIZATION TABLE ||
| --- | --- | --- | --- |
| | | AC COMPONENTS | DC COMPONENTS |
| 80~100 | 4:1:1 | SET A | 5 |
| 10~79 | 4:2:2 | SET B | 10 |
| 0~9 | 4:4:4 | SET C | 1 |

FIG.9

FOR LUMINANCE SIGNALS

FOR CHROMINANCE SIGNAL

SET A

| DC | 3  | 3  | 5  | 7  | 12 | 15 | 18 |
|----|----|----|----|----|----|----|----|
| 4  | 4  | 4  | 6  | 8  | 17 | 18 | 17 |
| 4  | 4  | 5  | 7  | 12 | 17 | 21 | 17 |
| 4  | 5  | 7  | 9  | 15 | 26 | 24 | 19 |
| 5  | 7  | 11 | 17 | 20 | 33 | 31 | 23 |
| 7  | 11 | 17 | 19 | 24 | 31 | 34 | 28 |
| 15 | 19 | 23 | 26 | 31 | 36 | 36 | 30 |
| 22 | 28 | 29 | 29 | 34 | 30 | 31 | 30 |

| DC | 5  | 7  | 14 | 30 | 30 | 30 | 30 |
|----|----|----|----|----|----|----|----|
| 5  | 6  | 8  | 20 | 30 | 30 | 30 | 30 |
| 7  | 8  | 17 | 30 | 30 | 30 | 30 | 30 |
| 14 | 20 | 30 | 30 | 30 | 30 | 30 | 30 |
| 30 | 30 | 30 | 30 | 30 | 30 | 30 | 30 |
| 30 | 30 | 30 | 30 | 30 | 30 | 30 | 30 |
| 30 | 30 | 30 | 30 | 30 | 30 | 30 | 30 |
| 30 | 30 | 30 | 30 | 30 | 30 | 30 | 30 |

SET B

| DC | 11 | 10 | 16 | 24 | 40  | 51  | 61  |
|----|----|----|----|----|-----|-----|-----|
| 12 | 12 | 14 | 19 | 26 | 58  | 60  | 55  |
| 14 | 13 | 16 | 24 | 40 | 57  | 69  | 56  |
| 14 | 17 | 22 | 29 | 51 | 87  | 80  | 62  |
| 18 | 22 | 37 | 56 | 68 | 109 | 103 | 77  |
| 24 | 35 | 55 | 64 | 81 | 104 | 113 | 92  |
| 49 | 64 | 78 | 87 | 103| 121 | 120 | 101 |
| 72 | 92 | 95 | 98 | 112| 100 | 103 | 99  |

| DC | 18 | 24 | 47 | 99 | 99 | 99 | 99 |
|----|----|----|----|----|----|----|----|
| 18 | 21 | 26 | 66 | 99 | 99 | 99 | 99 |
| 24 | 26 | 56 | 99 | 99 | 99 | 99 | 99 |
| 47 | 66 | 99 | 99 | 99 | 99 | 99 | 99 |
| 99 | 99 | 99 | 99 | 99 | 99 | 99 | 99 |
| 99 | 99 | 99 | 99 | 99 | 99 | 99 | 99 |
| 99 | 99 | 99 | 99 | 99 | 99 | 99 | 99 |
| 99 | 99 | 99 | 99 | 99 | 99 | 99 | 99 |

SET C

| DC  | 18  | 17  | 27  | 40  | 66  | 85  | 101 |
|-----|-----|-----|-----|-----|-----|-----|-----|
| 20  | 20  | 23  | 32  | 43  | 96  | 100 | 91  |
| 23  | 22  | 27  | 40  | 66  | 95  | 115 | 93  |
| 23  | 28  | 37  | 48  | 85  | 144 | 133 | 103 |
| 30  | 37  | 61  | 93  | 113 | 181 | 171 | 128 |
| 40  | 58  | 91  | 106 | 134 | 173 | 188 | 153 |
| 81  | 106 | 129 | 144 | 171 | 201 | 199 | 168 |
| 120 | 153 | 158 | 163 | 186 | 166 | 171 | 164 |

| DC  | 30  | 40  | 78  | 164 | 164 | 164 | 164 |
|-----|-----|-----|-----|-----|-----|-----|-----|
| 30  | 35  | 43  | 110 | 164 | 164 | 164 | 164 |
| 40  | 43  | 93  | 164 | 164 | 164 | 164 | 164 |
| 78  | 110 | 164 | 164 | 164 | 164 | 164 | 164 |
| 164 | 164 | 164 | 164 | 164 | 164 | 164 | 164 |
| 164 | 164 | 164 | 164 | 164 | 164 | 164 | 164 |
| 164 | 164 | 164 | 164 | 164 | 164 | 164 | 164 |
| 164 | 164 | 164 | 164 | 164 | 164 | 164 | 164 |

IMAGE COMPRESSING APPARATUS AND IMAGE READING APPARATUS INCLUDING THE SAME, IMAGE PROCESSING APPARATUS INCLUDING IMAGE COMPRESSING APPARATUS AND IMAGE FORMING APPARATUS INCLUDING THE SAME, IMAGE COMPRESSION PROCESSING METHOD, COMPUTER PROGRAM THEREOF, AND RECORDING MEDIUM

CROSS-NOTING PARAGRAPH

This Non-provisional application claims priority under 35 U.S.C. §119 (a) on Patent Application No. 2006-169013 filed in JAPAN on Jun. 19, 2006, the entire contents of which are hereby incorporated herein by reference.

FIELD OF THE INVENTION

The present invention relates to an image compressing apparatus that executes a suitable JPEG compression process depending on document types of image data to realize maintenance of good image quality and improvement of a compression rate at the same time and an image reading apparatus including the image compressing apparatus, an image processing apparatus including the image compressing apparatus and an image forming apparatus including the same, an image compression processing method, a computer program thereof, and a recording medium.

BACKGROUND OF THE INVENTION

Recent digital multi-function peripherals (MFP) include a function that files image data in a hard disk, an image transmission function such as Scan-to-Email, etc. In such devices, a compression process is performed for image data when saving or transmitting the image data and a JPEG compression mode is widely used for the mode thereof.

In a standard JPEG compression mode, some parameters such as a quantization table and a subsampling can be set. These parameters are responsible for trade-off between image quality and a compression rate of a compressed image and adjustment can be performed in accordance with purpose and preference, such as setting that focuses on image quality, compression rate, or averagely maintaining both, for example. In view of the above situations, it is desirable to further set optimum parameters in accordance with a type of image such as setting appropriate for a text image, setting appropriate for a halftone dot image, or setting appropriate for mixed image including both.

However, in general, compression parameters are often uniformly set regardless of types of target images, and the applied parameters often are fixed values preliminarily stored in devices or values arbitrarily and manually specified by users.

The following technologies are disclosed as techniques of discriminating a type of image to selectively switch and apply compression parameters.

Japanese Laid-Open Patent Publication No. 2002-247373 describes an example of determining a type of image for every eight lines to select a quantization table depending on the result thereof. Specifically, an image area is determined for every eight lines in a target image to select one of a plurality of preliminarily prepared quantization tables depending on the determination result (text or picture), and the quantization table is used to perform JPEG encoding for the eight-line image data. The encoded data are transmitted in a format that adds image area determination information (i.e., encoded table information) to the encoded data for each line. When receiving the encoded data in this format, the image area determination information included in the encoded data is detected and the quantization table same as that used for encoding is selected and decoded to restore the data to eight-line decompressed image data.

Japanese Laid-Open Patent Publication No. 2000-350037 describes an example of recognizing a type of image for every 8×8 pixels (for each block of DCT process) to select a quantization table depending on the result thereof. Specifically, if the number of gray levels of image data of an 8×8-pixel block is two to an arbitrary number, the block is recognized as a text/simple image, and if the block is recognized as the text/simple image, the quantization table is changed so as not to delete a high-frequency component to perform the JPEG encoding. In this case, the compressed data are data in a format that adds a recognition flag of each block to the JPEG encoded data. When restoring the compressed data, the added recognition flags are referenced to change and decode the quantization table as is the case with the encoding.

The above techniques are problematic in that the format of the compressed data is not compliant with the standard JPEG file format. In either technique, the compressed data have a unique format that having image type recognition information added in addition to the encoded data of the image. If such a unique format is used, the image data cannot be restored unless the format is supported and can be handled on the data decoding side (receiving side). That is, since the unique data formats cannot be decoded with a standard JPEG decompressing algorithm (such as circuit and program), the decoding side must have a dedicated decompressing circuit or program so that data in the unique formats can be decoded.

Since the recognition information is added for each block or each line in either technique, it is problematic that a data size after compression is correspondingly increased and that a compression rate cannot be improved. Only the switching of the quantization table is performed for the compression parameters, and the compression rate is not sufficiently improved in accordance with a type of image.

Since the compression algorithm is not compliant with the standard JPEG in either technique, a lack of versatility also is a problem. That is, since a mechanism not included in the standard JPEG compression algorithm is disposed which is a mechanism of switching the quantization table for each block or every eight lines and a mechanism of forming data in a unique format adding the recognition information and since an area (image area) identification signal is required for every eight lines or each 8×8 block, general-purpose JPEG compression circuit and program cannot be used, and special compression circuit and program must be designed and developed for each technique.

SUMMARY OF THE INVENTION

In order to solve the above problems, the present invention comprises the following technical means.

A first technical means is an image compressing apparatus comprising a JPEG compression section that executes JPEG compression for document image data to output a JPEG code; a document discrimination section that discriminates a type of document of the document image data for each page to output a document discrimination signal; and a parameter setting section that sets parameters for JPEG compression in accordance with the document discrimination signal, the JPEG compression section using the parameters set by the parameter setting section to execute a JPEG compression process.

A second technical means is the image compressing apparatus as defined in the first technical means, wherein the parameter setting section selectively switches a quantization table and a subsampling for JPEG compression in accordance with the document discrimination signal to set the parameters.

A third technical means is the image compressing apparatus as defined in the second technical means, wherein values of AC components and DC components in the quantization table can arbitrarily be changed.

A fourth technical means is the image compressing apparatus as defined in the first technical means, wherein the parameter setting section linearly changes values of AC components in a quantization table for JPEG compression based on the document discrimination signal to set the parameters.

A fifth technical means is the image compressing apparatus as defined in the fourth technical means, wherein when the values of AC components in the quantization table are linearly changed, coefficients used in a linear operation can arbitrarily be changed.

A sixth technical means is the image compressing apparatus as defined in the first technical means, wherein if the document discrimination signal indicates that a document has a high proportion of a text area, the parameter setting section calculates a quantization table that finely quantizes high-frequency components and selects a subsampling of 4:1:1 to set the parameters.

A seventh technical means is the image compressing apparatus as defined in the first technical means, wherein if the document discrimination signal indicates that a document has a low proportion of a text area, the parameter setting section calculates a quantization table that roughly quantizes high-frequency components and selects a subsampling of 4:4:4 to set the parameters.

An eighth technical means is the image compressing apparatus as defined in the first technical means, wherein if the document discrimination signal indicates that text and other areas are mixed on a document, the parameter setting section calculates a quantization table that somewhat roughly quantizes high-frequency components and selects a subsampling of 4:2:2 to set the parameters.

A ninth technical means is the image compressing apparatus as defined in the first technical means, wherein if the document discrimination signal indicates that a document has a low proportion of a text area, the parameter setting section calculates a quantization table that has a DC component value of one to set the parameters.

A tenth technical means is an image reading apparatus comprising a document reading section that reads a document image; a JPEG compression section that executes JPEG compression for the read document image data to output a JPEG code; a document discrimination section that discriminates a type of document of the document image data for each page to output a document discrimination signal; and a parameter setting section that sets parameters for JPEG compression in accordance with the document discrimination signal, the JPEG compression section using the parameters set by the parameter setting section to execute a JPEG compression process.

An eleventh technical means is an image processing apparatus comprising a document discrimination section that discriminates a type of document of the document image data for each page to output a document discrimination signal; a parameter setting section that sets parameters for JPEG compression in accordance with the document discrimination signal; a JPEG compression section that uses the parameters set by the parameter setting section to output a JPEG code; a storage section that stores the JPEG code output from the JPEG compression section; a JPEG decompression section that decodes and decompresses the JPEG code stored in the storage section into image data; and a subsequent-stage image processing section that executes an image process for the image data decompressed by the JPEG decompression section.

A twelfth technical means is an image forming apparatus comprising the image processing apparatus as defined in the eleventh technical means.

A thirteenth technical means is an image compression processing method comprising a step of executing JPEG compression for input document image data to output a JPEG code; a step of discriminating a type of document of the input document image data for each page to output a document discrimination signal; a step of setting parameters for JPEG compression in accordance with the document discrimination signal; and a step of executing a JPEG compression process based on the set parameters.

A fourteenth technical means is the image compression processing method as defined in the thirteenth technical means, wherein the step of setting the parameters includes a step of selectively switching a quantization table and a subsampling for JPEG compression in accordance with the document discrimination signal.

A fifteenth technical means is the image compression processing method as defined in the fourteenth technical means, wherein values of AC components and DC components in the quantization table can arbitrarily be changed.

A sixteenth technical means is the image compression processing method as defined in the thirteenth technical means, wherein the step of setting the parameters includes a step of linearly changing values of AC components in a quantization table for JPEG compression based on the document discrimination signal.

A seventeenth technical means is the image compression processing method as defined in the sixteenth technical means, wherein when the values of AC components in the quantization table are linearly changed, coefficients used in a linear operation can arbitrarily be changed.

An eighteenth technical means is the image compression processing method as defined in the thirteenth technical means, wherein the step of setting the parameters includes a step of calculating a quantization table that finely quantizes high-frequency components and selecting a subsampling of 4:1:1 if the document discrimination signal indicates that a document has a high proportion of a text area.

A nineteenth technical means is the image compression processing method as defined in the thirteenth technical means, wherein the step of setting the parameters includes a step of calculating a quantization table that roughly quantizes high-frequency components and selecting a subsampling of 4:4:4 if the document discrimination signal indicates that a document has a low proportion of a text area.

A twentieth technical means is the image compression processing method as defined in the thirteenth technical means, wherein the step of setting the parameters includes a step of calculating a quantization table that somewhat roughly quantizes high-frequency components and selecting a subsampling of 4:2:2 if the document discrimination signal indicates that text and other areas are mixed on a document.

A twenty-first technical means is the image compression processing method as defined in the thirteenth technical means, wherein the step of setting the parameters includes a step of calculating a quantization table that has a DC component value of one if the document discrimination signal indicates that a document has a low proportion of a text area.

A twenty-second technical means is a program driving a computer to execute the image compression processing method as defined in the thirteenth technical means.

A twenty-third technical means is a computer-readable recording medium having recorded thereon the program driving a computer to execute the image compression processing method as defined in the thirteenth technical means.

BRIEF DESCRIPTION OF THE DRAWINGS

FIG. 8 depicts examples of document discrimination signals and compression parameters output correspondingly;

FIG. 9 depicts examples of AC components of quantization tables;

PREFERRED EMBODIMENTS OF THE INVENTION

First Embodiment

[Image Compressing Apparatus and Image Reading Apparatus Including the Same]

Figure 1:
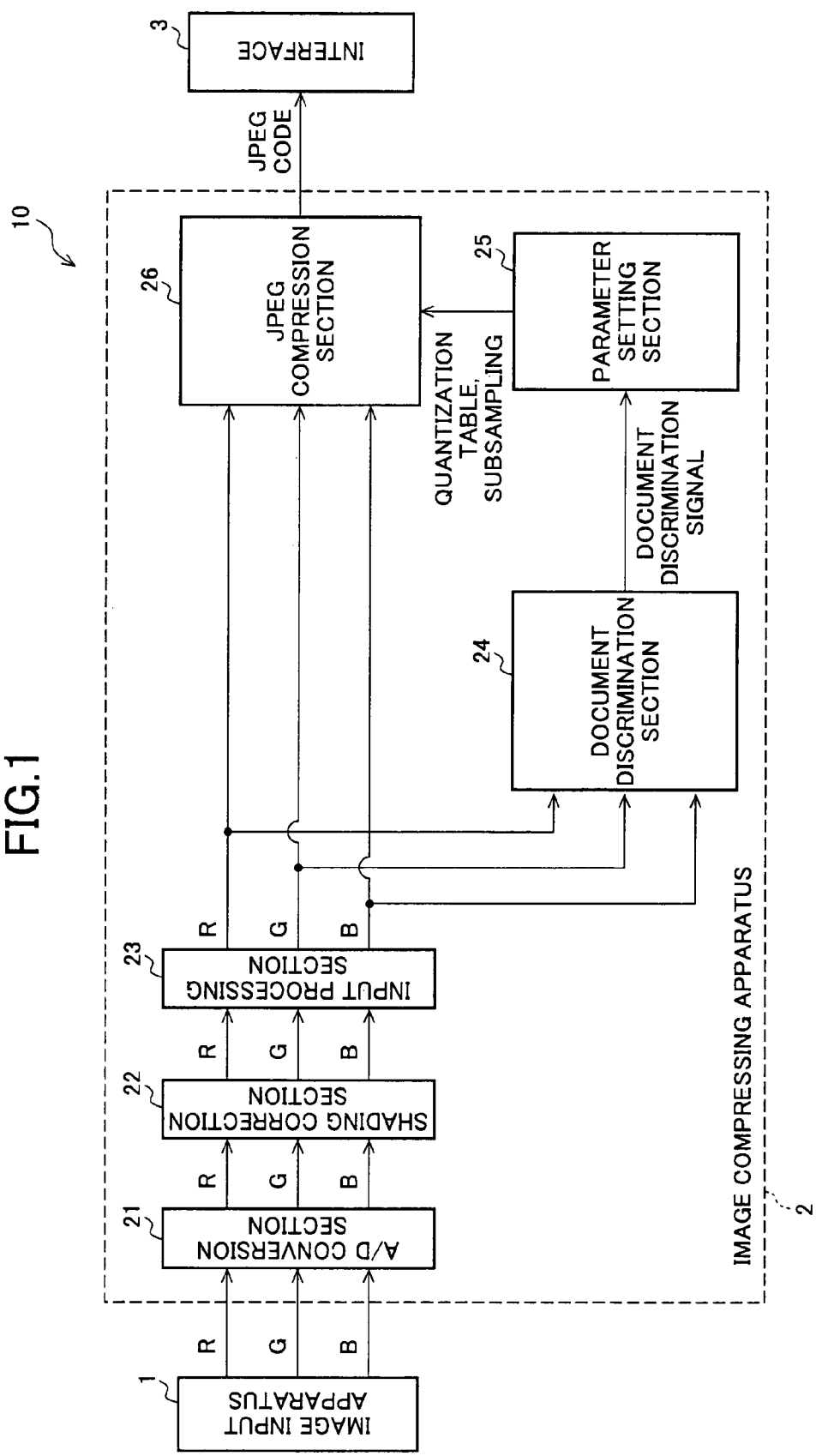
FIG. 1 is a block configuration diagram of a digital color image reading apparatus (digital scanner) that is an embodiment according to the present invention.

FIG. 1 is a block configuration diagram of a digital color image reading apparatus (digital scanner) that is an embodiment according to the present invention. An image reading apparatus 10 includes an image input apparatus 1, an image compressing apparatus 2, and an interface 3.

The image input apparatus 1 uses a CCD (Charge Coupled Device) licenser to convert light reflected from a document into electric signals separated by colors of R, G, and B (R: red, G: green, and B: blue). The color image signals (RGB analog signals) converted by the licenser are converted into digital signals by an A/D (analog/digital) conversion section 21 of the image compressing apparatus 2, and after a shading correction section 22 removes various distortions generated by an illumination system, an image focusing system, and an image sensing system of the image input apparatus 1, an input processing section 23 executes a process of correcting γ, etc., for each of the RGB signals.

The RGB signals are then delivered to a JPEG compression section 26 and a document discrimination section 24.

The document discrimination section 24 discriminates what document type an input image belongs to and outputs a document discrimination signal for each page. A parameter setting section 25 calculates optimum compression parameters (a quantization table and a subsampling) in accordance with the document discrimination signal, which are set in the JPEG compression section 26.

On the other hand, the JPEG compression section 26 executes a process of encoding RGB image data with the use of the parameters delivered from the parameter setting section 25. Header information is generated for each page and output along with the encoded data as a JPEG code. A standardized JPEG compression algorithm is used for this encoding process and the added header information is in a standardized data format. Standard header information means that image width and height, a quantization table, a Huffman encoding table, a subsampling, etc., are delimited by specified marker symbols and described in sequence.

The JPEG code acquired by executing the optimum compression process depending on the document type is transferred as a mail through an interface 3 to a personal computer connected to a network and to a mail server connected to the internet.

<Document Discrimination Section>

Figure 2:
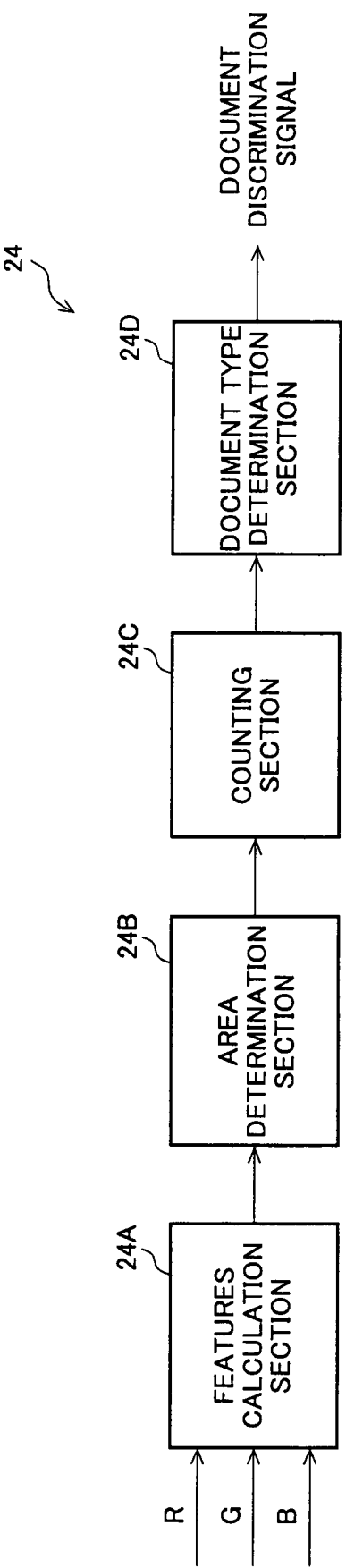
FIG. 2 depicts a configuration of a document discrimination section 24.

FIG. 2 depicts a configuration of the document discrimination section 24. The document discrimination section 24 includes a features calculation section 24A, an area determination section 24B, a counting section 24C, and a document type determination section 24D. When the image data are sequentially scanned and input line-by-line, the features calculation section 24A calculates two types of features for every predetermined number of pixels (hereinafter, "Z pixels", e.g., 100 pixels). The area determination section 24B determines based on two types of the features whether the Z-pixel portion belongs to text, halftone dot, or other areas. The area determination results are sequentially delivered to the counting section 24C to count accumulated area determination results. The document type determination section 24D discriminates a document type based on the count value of each of the area determination results when the image scan is completed for one page and outputs the document discrimination signal.

The features calculation section 24A calculates the following first and second features.

Figure 3:
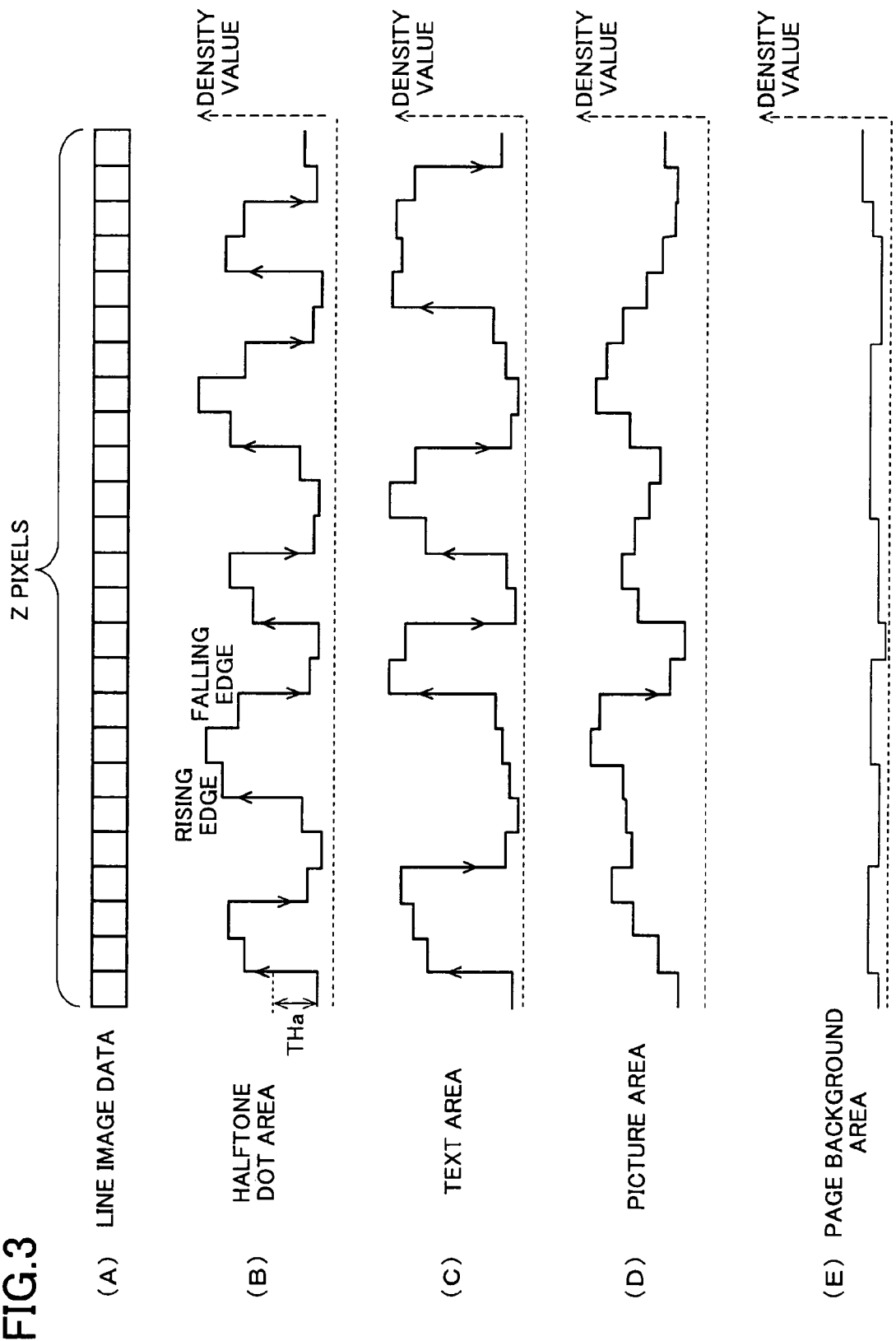
FIG. 3 depicts examples of changes in density of various areas relative to line image data (z pixels) and how a first features is calculated.

FIG. 3 depicts examples of changes in density (pixel value) of various areas relative to line image data of the z-pixel portion ((A) of FIG. 3) and how the first features is calculated. First, if a density difference between the adjacent pixels is equal to a predetermined threshold value THa (e.g., 30, if image data are represented by 256 gray levels, and this value may arbitrarily be changed) or more, a portion changing from low density to high density is detected as a "rising edge" and, contrary, a portion changing from high density to low density is detected as a "falling edge". The number of "rising edges" and "falling edges" in the Z-pixel portion is calculated as the first features. The density significantly changes many times within a local area in an areas such as the halftone dot and text areas ((B) and (C) of FIG. 3) and the number of times is smaller in areas such as picture (continuous tone image) and page background areas ((D) and (E) of FIG. 3). Therefore, if the first features is larger than a certain level, the area can be determined as the halftone dot area or text area.

Figure 4:
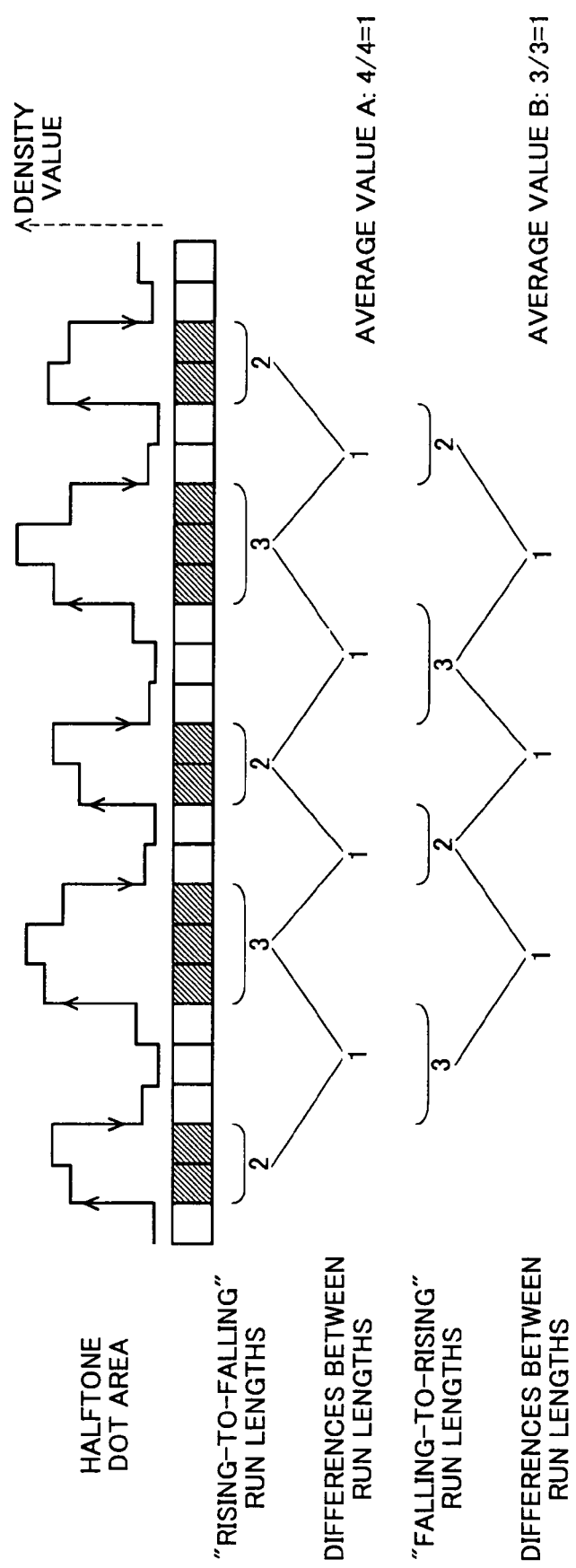
FIG. 4 depicts how a second features is calculated in the case of a halftone dot area.
Figure 5:
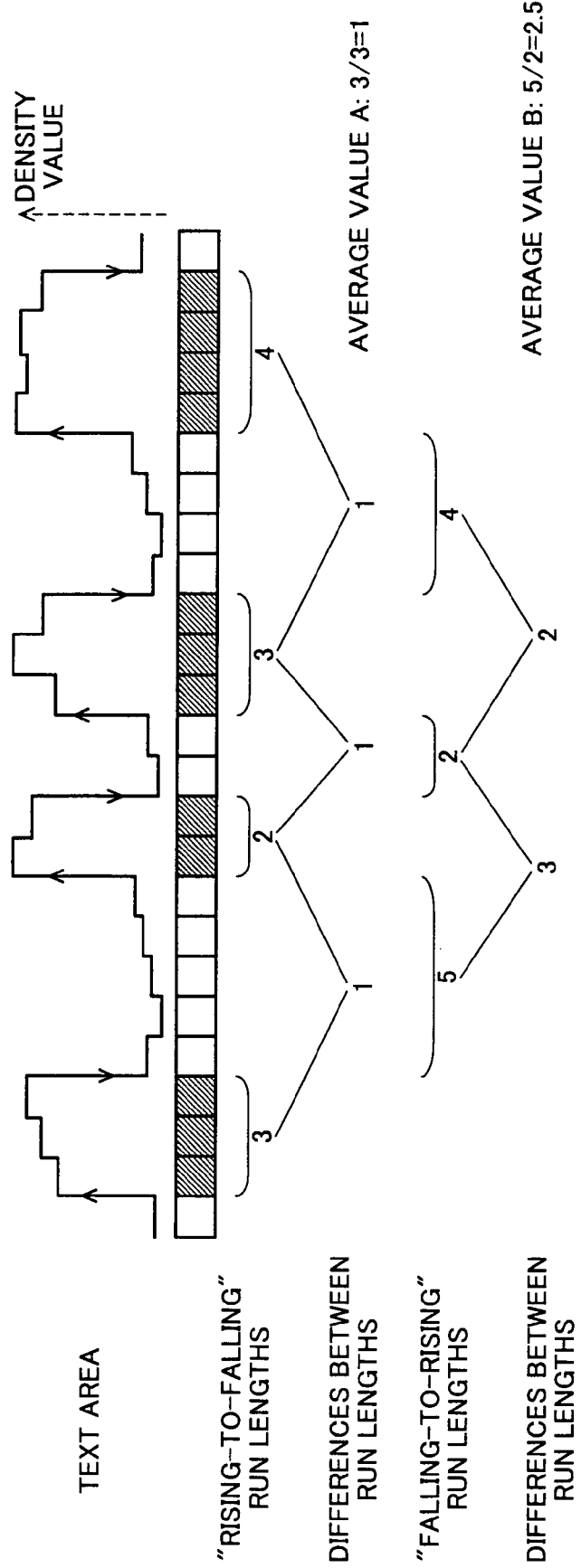
FIG. 5 depicts how a second features is calculated in the case of a text area.

FIGS. 4 and 5 depict how the second features is calculated, and the numbers of pixels from "rising edges" to "falling edges" are obtained as "rising-to-falling" run lengths to sequentially obtain differences thereof. An average value of differences of the run lengths is defined as an average value A. On the other hand, the same value is obtained for the "falling-to-rising" case and defined as an average value B. A sum of the average value A and the average value B in the Z-pixel portion is calculated as the second features. In the example of FIG. 4, both the average value A and the average value B are "1" and therefore, the second features is "2". Since the halftone dot area has periodicity as shown in FIG. 4, it can be said that the difference between the run lengths becomes small. As shown in FIG. 5, the difference between the run lengths tends to become comparatively large in the text area. In the example of FIG. 5, since the average value A is "1" and the average value B is "2.5", the second features is "3.5". Therefore, if the second features is larger than a certain level, the area can be determined as the text area, and if the second features is smaller than a certain level, the area can be determined as the halftone dot area.

If the first features is equal to the predetermined threshold value THb or more, the area determination section 24B determines that the area is the halftone dot or text area, and if the second features is equal to the predetermined threshold value THc or more, the area is determined as the text area, otherwise, the area is determined as the halftone dot area. Areas other than above are determined as other areas (such as picture and page background areas).

The threshold value THb may be set based on various image samples to a value that can be used for appropriately discriminating the halftone dot or text area from the first features. The threshold value THc may similarly be set to a value that can be used for identifying the text and halftone dot areas from the second features. For example, if resolution is 600 dpi and the number Z of pixels sequentially scanned and input line-by-line is 100 pixels, the setting is THb=5 and THc=3. Although the threshold values THb and THc are fixed values, the threshold values may be arbitrarily changed. Since the first features may vary if resolution of a scanner reading a document is changed or if the number of pixels used for calculating two features (value of Z) is changed, the threshold value THb may be defined and stored in a table in accordance with these parameters, and this table may be referenced to set the threshold value THb when the above parameters are changed.

The counting section 24c counts the accumulation of the area determination result of each of the text, halftone dot, and other areas determined for every Z pixels and delivers a text count value, a halftone dot count value, and other count value to the document type determination section 24D.

When the image scanning is completed for one page, the document type determination section 24D outputs a value calculated from equation 1 as the document discrimination signal. Equation 1 represents a proportion of the text area to one page of a document image:

document discrimination signal=(text count value÷total number of pixels)×100  [Equation 1]

where total number of pixels=text count value+halftone dot count value+other count value.

<JPEG Compression Section>

Figure 6:
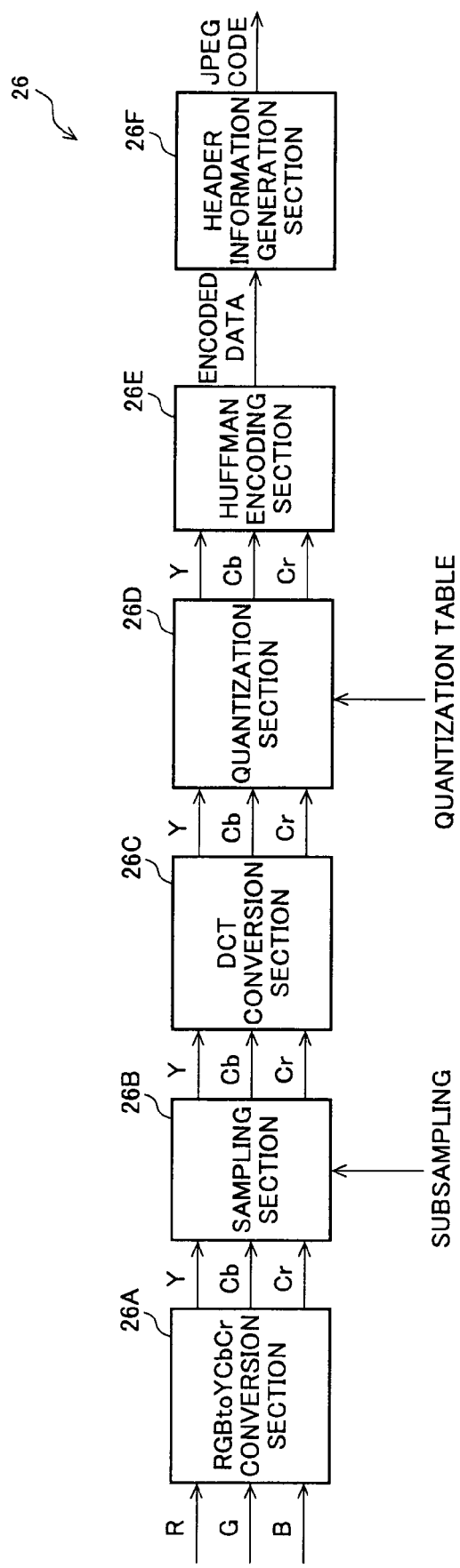
FIG. 6 depicts a configuration of a JPEG compression section 26.

FIG. 6 depicts a configuration of the JPEG compression section. Details thereof will hereinafter be described. All the processes executed here are based on a standardized JPEG compression algorithm.

The RGB signals delivered from the input processing section 23 (FIG. 1) are converted by an RGB-to-YCbCr conversion section 26A into a Y signal representing luminance information and Cb and Cr signals representing chrominance information. The YCbCr signals are delivered to a sampling section 26B to execute a downsampling process of pixel information of a chrominance signal in accordance with a predetermined subsampling. The subsampling can be selected from three ratios in accordance with a level of downsampling. In this embodiment, the process is performed with the use of the subsampling delivered from the parameter setting section 25 described later.

Figure 7:
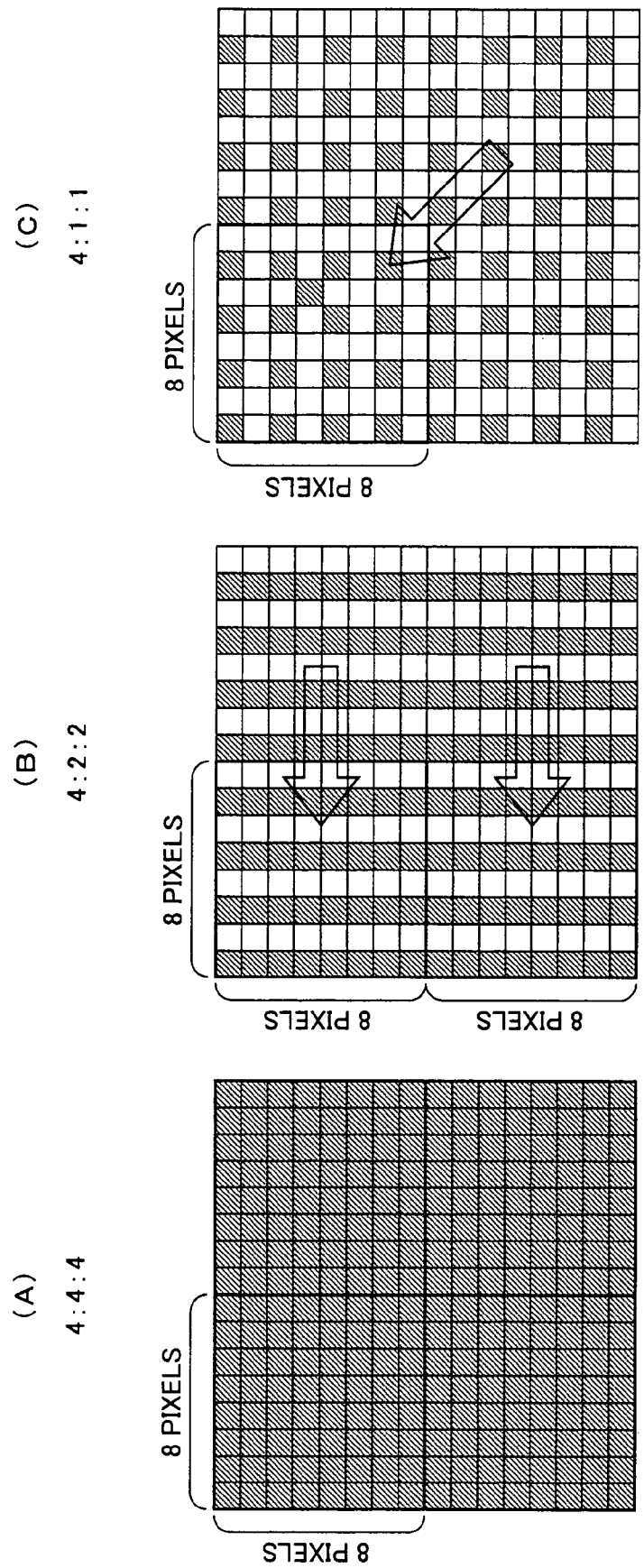
FIG. 7 depicts subsamplings and corresponding downsampling methods of pixels of chrominance signals.

FIG. 7 depicts the subsamplings and corresponding downsampling methods of pixels of chrominance signals. If the subsampling is specified to 4:4:4 ((A) of FIG. 7), four-block pixel information of the chrominance signal is used for four blocks (assuming that 8×8 pixels are one block, 2×2 blocks) of the luminance signal. If the subsampling is specified to 4:2:2 ((B) of FIG. 7), the chrominance signal is subjected to downsampling every other pixel in the vertical direction and only two-block pixel information (shaded area) is used. If the subsampling is specified to 4:1:1 ((C) of FIG. 7), the chrominance signal is vertically and horizontally subjected to downsampling every other pixel and only one-block pixel information (shaded area) is used.

The YCbCr signals output from the sampling section 26B are input to a DCT (Discrete Cosine Transform) conversion section 26C and separated to 64 levels of frequency components by DCT conversion for each block. Data at the upper left corner of the block are the DC (direct-current) component anhalftone dother 63 pieces of data are the AC (alternating-current) components.

The YCbCr signals separated to the frequency components are input to a quantization section 26D, and a predetermined quantization table is used to execute a quantization process for each block. Two quantization tables can be specified for the luminance signals and the chrominance signal, and each table is represented by 64 integer values. In this embodiment, the quantization table (values for each of the AC and DC components) delivered from the parameter setting section 25 described later is used to execute the process.

The quantized YCbCr signals are input to a Huffman encoding section 26E and rearranged in a line, and an encoding process is executed based on a predetermined Huffman encoding table. In the embodiment, values of the encoding table are not particularly limited, and extensively used general values are utilized.

The encoded data output from the Huffman encoding section 26E are input to a header information generation section 26F. The header information is generated for each page and the header information is added to the beginning of the encoded data to output a JPEG code in a format compliant with the JPEG image format. The header information includes descriptions of information such as image width and height, the quantization table used at the time of compression, the Huffman encoding table, and the subsampling delimited by specified marker symbols.

<Parameter Setting Section>

The parameter setting section 25 calculates optimum JPEG compression parameters based on the document discrimination signal delivered from the document discrimination section 24.

FIG. 8 depicts examples of document discrimination signals and correspondingly output subsamplings and quantization tables (AC components and DC components). FIG. 9 depicts examples of the values of the AC components of the quantization tables used in the table.

If the document discrimination signal is 80 to 100, that is, in the case of a document having very high proportion of the text area, parameters are output so as to attach importance to text legibility. Specifically, generally small values (e.g., set A of FIG. 9) can be set from the low frequency area to the high frequency area of the AC components in the quantization table to avoid a phenomenon that removes the high frequency components in the course of the JPEG compression process. Therefore, small texts can be reproduced well without lack of information. Relatively small values can be set for the DC components in the quantization table to suppress a phenomenon that generates mosquito noise around outlines of texts or within texts. Therefore, text legibility can be maintained for texts in all the sizes. The subsampling can be set to such a value that rough downsampling of the chrominance signal is performed to achieve improvement of the compression rate. Although the quantization table is set to attach importance to resolution and the compression rate tends to deteriorate, since color reproducibility may not be considered important in the case of a text image as compared to halftone dot or other pictures, the compression rate can significantly be improved by increasing the roughness of the subsampling.

If the document discrimination signal is 0 to 9, that is, in the case of a document having very high proportion of areas other than texts, parameters are output so as to attach importance to reproducibility of continuous-tone pictures and the halftone dot area (printed-pictures). Specifically, particularly large values (e.g., set C of FIG. 9) can be set for the high frequency area of the AC components in the quantization table to considerably remove the high frequency components in the course of the JPEG compression process to improve the compression rate. Due to smoothing of the noise buried in the picture or page background image and the high-frequency halftone dots (density fluctuations) configuring the halftone dot image, the images can smoothly be reproduced. Very small values can be set for the DC components in the quantization table to suppress a phenomenon that generates block noise in the halftone dot, picture, and background image. The direct-current components after DCT conversion represent an average value of the pixel values within the block, and if the value of the quantization table for the above direct-current component is set to 1, the quantization for the average value of the pixel value within the block is not performed, so that the change of gray level between the blocks can be maintained to a maximum extent. Therefore, the reproducibility of the images can be improved. The subsampling can be set to such a value that downsampling of the chrominance signal is not performed to faithfully reproduce the color of the picture and halftone dot images.

If the document discrimination signal is 10 to 79, that is, in the case of a document with the text area and other areas mixed, parameters are output so as to maintain both the text legibility and the reproducibility of the picture and halftone dot areas. Specifically, intermediate values of the above two examples (e.g., set B of FIG. 9) can generally be set from the low frequency area to the high frequency area of the AC components in the quantization table to properly remove the high frequency components in the course of the JPEG compression process to moderately improve the compression rate. Since noise of other areas can moderately be removed while suppressing the lack of small texts, image quality can be reproduced well in an averaged manner. Somewhat large values can be set for the DC components in the quantization table to moderately improve the compression rate. The subsampling can be set to such a value that downsampling of the chrominance signal is performed to a certain extent to moderately improve the compression rate without considerably deteriorating the color of the picture and halftone dot images.

Although the document discrimination signals are divided into three levels to select the parameters, the document discrimination signals may be divided into more or less levels. The sets of AC components are values preliminarily stored in a memory, etc., or values arbitrarily set by a user's operation.

The AC components of the quantization table are calculated by a simple arithmetic expression in another example. Equation 2 is an equation of calculating the values of the AC components through a linear operation in accordance with the document discrimination signals:

$$\text{AC component } (i,j) = \text{default value } (i,j) \times (\text{document discrimination signal} \times \alpha + \beta) \quad \text{[Equation 2]}$$

where i,j are coordinates indicating a position in the quantization table;

the default value is an arbitrary quantization table; and $\alpha$ and $\beta$ are arbitrary real numbers and are $\alpha<0$ and $\beta>0$.

e.g., default value=set B, $\alpha=-10/6$ and $\beta=11/6$.

In this way, the quantization table can smoothly be changed in accordance with percentage of the text area without drastically changing the values at boundary of levels as in the case of the above example. Therefore, optimum parameters can be set in accordance with the document type.

As above, the JPEG compression parameters can appropriately be switched depending on document types of image data to realize the maintenance of good image quality and the improvement of the compression rate at the same time.

The coefficients $\alpha$ and $\beta$ and the default value are normally fixed and can be changed depending on a system environment, etc., to execute an appropriate process. For example, if the resolution of the scanner is low, deterioration of texts can be suppressed by increasing the absolute value of $\alpha$.

The values of $\alpha$ and $\beta$ may be determined in consideration of the image quality and the file capacity or depending on which is prioritized if texts, the halftone dot area, and the continuous-tone image area are mixed.

Second Embodiment

[Image Processing Apparatus and Image Forming Apparatus including the Same]

Figure 10:
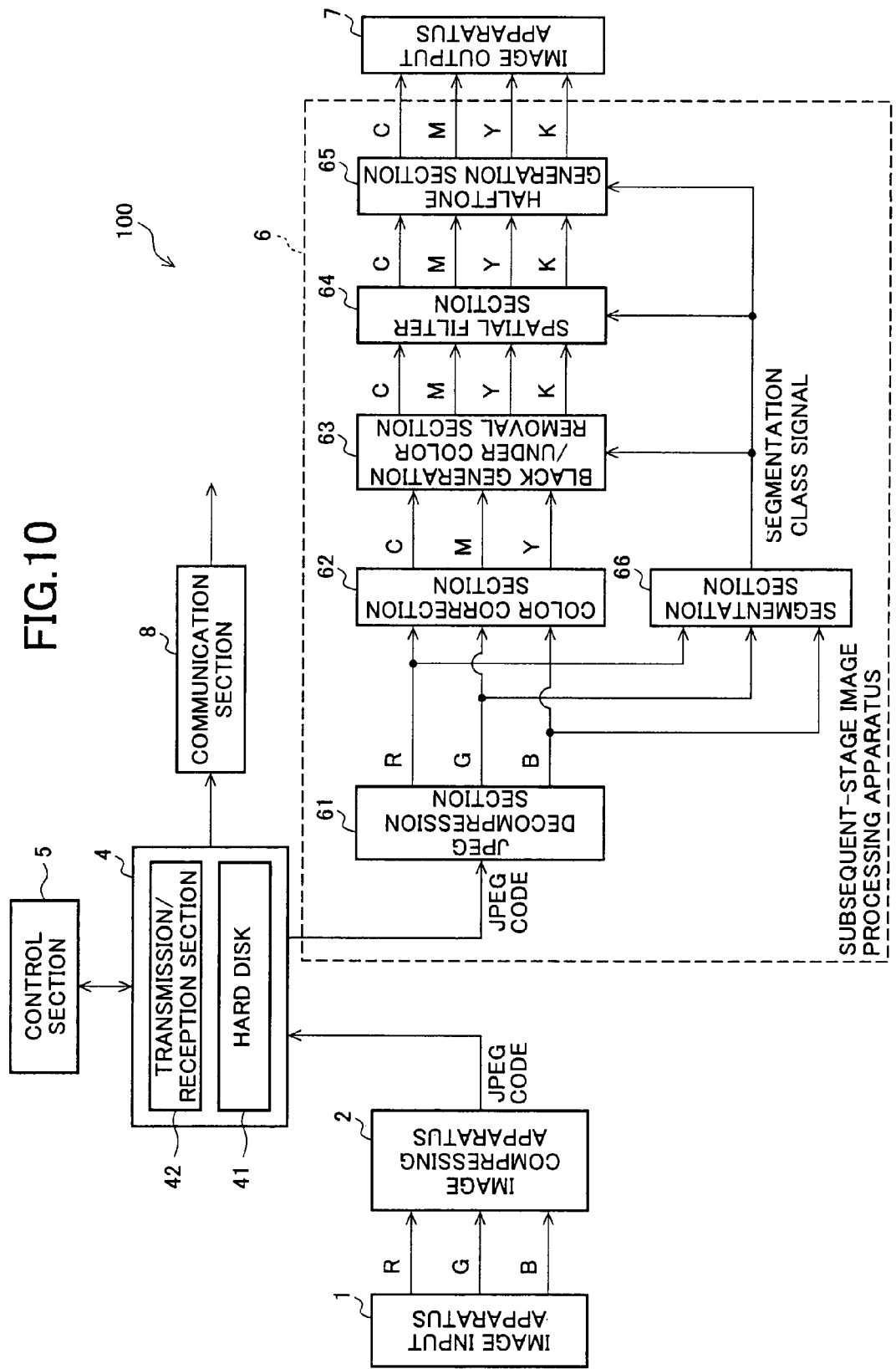
FIG. 10 is a block configuration diagram of a digital color image processing (forming) apparatus that is a second embodiment according to the present invention.

FIG. 10 is a block configuration diagram of a digital color image processing (image forming) apparatus (digital copier, multi-function peripheral) that is a second embodiment according to the present invention.

An image processing (forming) apparatus 100 includes a transmission-reception section/hard disk 4, a control section 5, a subsequent-stage image processing apparatus 6, an image output apparatus 7, and a communication section 8, in addition to the above image input apparatus 1 and the image compressing apparatus 2.

The JPEG code output from the JPEG compression section 26 of the image compressing apparatus 2 is delivered to the transmission-reception section/hard disk 4. The JPEG code is temporarily saved in a hard disk 41 and managed as filing data. When a copy output operation or print output operation is instructed, the JPEG code is taken out from the hard disk by a control signal from the control section 5 and delivered to a JPEG decompression section 61 of the subsequent-stage image processing apparatus 6.

On the other hand, in the case of an image transmission operation such as a Scan-to-Email function, the JPEG code is taken out from the hard disk 41 and sent through a transmission-reception section 42 to the communication section 8 to transfer compressed image data to an externally connected apparatus or a communication line through a network or a communication wire. The management of filing data and the operation control of data delivery are performed by the control section 5.

The JPEG decompression section 61 executes such a process that decodes the header information of the JPEG code to decode a sign code and decompresses the JPEG code into image data of RGB signals. All the processes executed here are based on a standardized JPEG decompression algorithm.

A color correction section 62 generates CMY (C: cyan, M: magenta, and Y: yellow) signals that are complementary colors of the RGB signals and executes a process of enhancing the color reproducibility. A black generation/under color removal section 63 performs conversion into CMYK (K: black) four-color signals; a spatial filter section 64 executes an emphasizing process and a smoothing process for the CMYK signals; and a halftone generation section 65 executes a gray level reproduction process for outputting an image.

On the other hand, a segmentation section 66 executes a process of determining what type of area each pixel of input image data belongs to, e.g., determining an area that the pixel belongs to, such as a black-text, color-text, or halftone dot area. The segmentation class signal output from the segmentation section 66 is delivered to the black generation/under color removal section 63, the spatial filter section 64, and the halftone generation section 65 and the processes are suitably switched in accordance with various areas.

The CMYK signals output from the halftone generation section 65 are delivered to the image output apparatus 7 to form a final output image. The image output apparatus is an apparatus that reproduces images, such as an electrophotographic printer and an inkjet printer, and may be an image display system such as a liquid crystal display.

Since the JPEG compression parameters can appropriately be switched in accordance with the document type of the image data in this configuration, the image finally output from the image output apparatus can be realized as a good image having less image quality deterioration due to the JPEG compression. Since the compression rate is appropriately improved in accordance with the document type, volume of data can be reduced in the hard disk to reduce the time for transmitting data to the outside, the time for transferring data within the apparatus such as writing and reading data into/from the hard disk, and even the time for processing images.

Third Embodiment

Another application example of the present invention can be configured by recording the image processing method (image compression processing method) in a computer-readable recording medium having recorded thereon a program to be executed by a computer. In this case, a recording medium having recorded thereon a program of executing the image process can be provided and freely carried.

With regard to the recording medium, a memory not shown such as a ROM itself may be a program medium since the computer executes the process, or a program reading apparatus may be disposed as an external storage apparatus not shown and the recording medium may be a program medium readable when inserting into the program reading apparatus.

In any case, the stored program may be accessed and executed by a microprocessor, or the program may be read out and the read program may be downloaded into a program storage area not shown of the computer to execute the program. The downloading program is assumed to be stored in a main apparatus in advance.

The program medium is a recording medium configured to be detachable from the main apparatus and may be a medium fixedly carrying the program including a tape system such as magnetic tapes and cassette tapes, a disk system including magnetic disks such as floppy (registered trademark) disks and hard disks and an optical disks such as CD-ROM/MO/MD/DVD, a card system such as IC cards (including memory cards)/optical cards, or a semiconductor memory such as mask ROM, EPROM, EEPROM, and flash ROM.

The program medium may be a medium fluidly carrying the program such that a medium has a system configuration connectable to a communication network including the internet to download a program from the communication network. If the program is downloaded from the communication network, the downloading program may be stored in the main apparatus in advance or may be installed from another recording medium.

Figure 11:
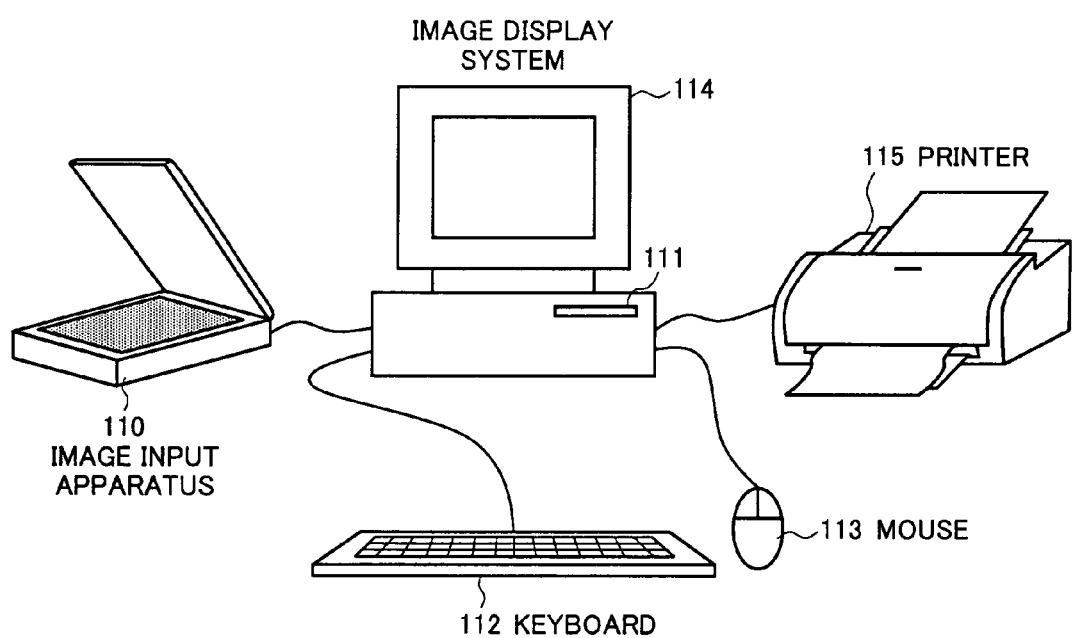
FIG. 11 depicts a system configuration when an image compressing process according to the present invention is executed in a computer system.

The above image processing method is performed by reading the recording medium with the digital color image processing (image forming) apparatus or a program reading apparatus disposed in a computer system shown in FIG. 11. Particularly, in the latter case, the image processing method can be used in accordance with a user's preference.

The computer system shown in FIG. 11 is configured by an image input apparatus 110 such as a flatbed scanner, a film scanner, and a digital camera, a computer 111 that loads predetermined programs to execute various processes such as the above image processing method, a keyboard 112 and a mouse 113 that execute data process of the computer 111, an image display system 114 that displays the process results of the computer, such as a CRT display and a liquid crystal display, and a printer 115 that outputs the process results of the computer onto paper, etc. A modem, etc., are also disposed as a communicating means for connecting through a network to a server, etc.

If the image processing method is performed by this computer system, the threshold values of the sections can arbitrarily and easily be changed and a process can be executed in accordance with a user's preference such as changing the settings depending on the results shown by the image display system. The threshold values are changed by directly entering numeric values with the use of the keyboard 112 and the mouse 113 or are set by dragging symbols representing the threshold values.

Figure 12:
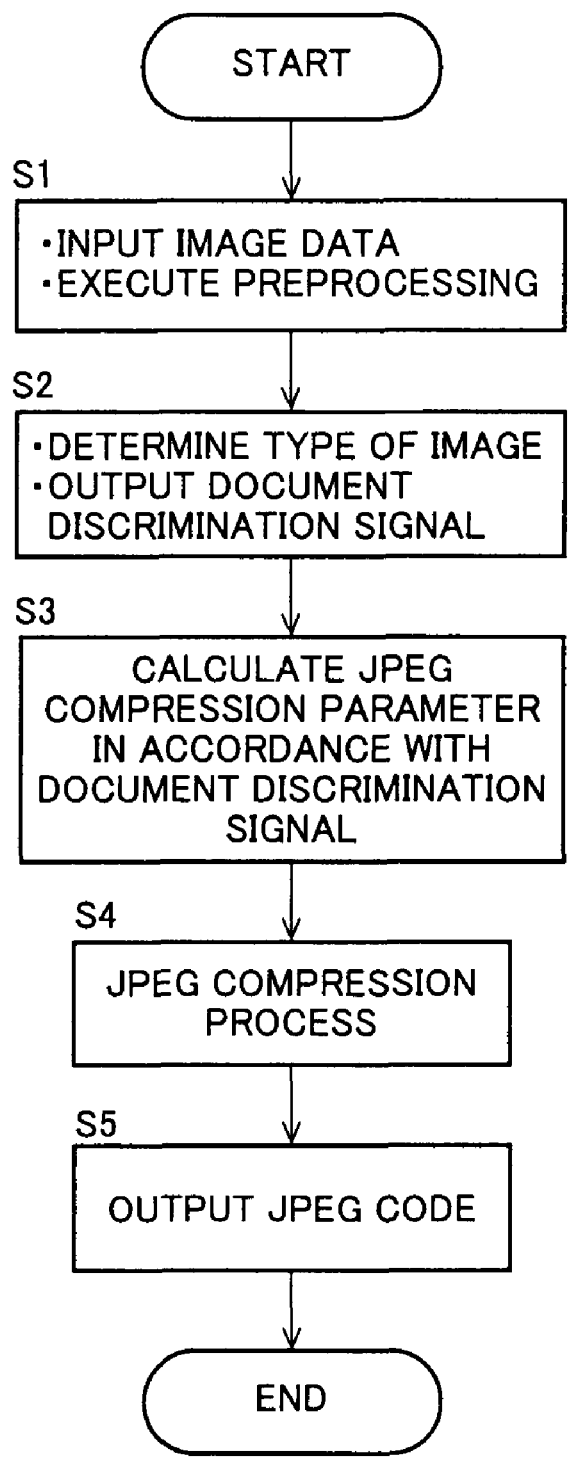
FIG. 12 is a flowchart of a flow of the image compressing process according to the present invention.

FIG. 12 is a flowchart of a flow of the image compressing process according to the present invention. Steps will hereinafter be described.

At step S1, image data are input and are subjected to a preprocessing for conversion into signals suitable for an image process as needed, and at step S2, a type of image is discriminated for each page to calculate the document discrimination signal.

At step S3, the JPEG compression parameters (the subsampling and the AC components and DC components of the quantization table) are calculated in accordance with the document discrimination signal calculated at step S2. At step S4, the parameters calculated at step S3 are used to execute the JPEG compression process for the image data, and the header information is added to each page to generate the JPEG code, which is output at step S5.

The present invention includes the above technical means and has the following effects.

(1) The JPEG compression parameters can appropriately be switched in accordance with the document type of the image data to realize the maintenance of good image quality and the improvement of the compression rate at the same time.

(2) Since the values of both the quantization table and the subsampling can appropriately be set in accordance with the document type to save/delete optimum information depending on image characteristics at the time of the JPEG compression process, the maintenance of good image quality and the improvement of the compression rate can be realized at the same time.

(3) As compared to selectively switching values of the quantization table, the values are not drastically changed and the values can smoothly be changed in accordance with the document discrimination signal. Therefore, optimum parameters can be set in accordance with the document type.

(4) The mosquito noise generated around texts can be suppressed to improve legibility. While information of small texts is reproduced well without lack, the compression rate can significantly be improved.

(5) Noise included in images can be removed. While color information of pictures and halftone dots is faithfully reproduced without lack, the compression rate can significantly be improved.

(6) While suppressing lack of small texts, noise in other areas can moderately be removed. Color of pictures and halftone dots can be reproduced well without considerable deterioration. The compression rate can moderately be improved.

(7) Image quality can be prevented from deteriorating due to the block noise generated in pictures and halftone dots.

(8) The JPEG compression parameters can appropriately be switched in accordance with the document type to realize an image reading apparatus maintaining good image quality and improving the compression rate at the same time.

(9) Since the JPEG compression parameters can appropriately be switched in accordance with the document type of the image data, a good image can be acquired with less image quality deterioration due to the JPEG compression even when some sort of image process is performed after decompression. Since the compression rate can appropriately be improved in accordance with the document type, volume of data saved in the hard disk can be reduced, and transfer time required for writing and reading data into/from the hard disk can also be reduced.

(10) A good image can be reproduced with less image quality deterioration due to the JPEG compression.

(11) The program can be loaded into a general-purpose computer such as a personal computer through a recording medium such as CD-ROM or downloading from a network to execute the optimum JPEG compression process for an input image in accordance with the document type and to output the JPEG code that realizes the maintenance of good image quality and the improvement of the compression rate at the same time. The program can also be loaded into a flash memory or a rewritable recording medium for a digital copier and multi-function peripheral that executes a software process with DSP (Digital Signal Processor), etc., to execute the optimum JPEG compression process for an input image in accordance with the document type and to output the JPEG code that realizes the maintenance of good image quality and the improvement of the compression rate at the same time.

(12) Since a user can arbitrarily change various parameters, the processes can be realized in accordance with the user's preference.

The invention claimed is:

1. An image compressing apparatus that compresses input document image data by JPEG compression comprising:
document type discrimination means for calculating with a following equation 1 a document discrimination signal indicating a proportion that a text area accounts for in one page of a document for the document image data;

$$\text{document discrimination signal} = (\text{text pixel count value} \div \text{total number of pixels}) \times 100 \quad \text{(Equation 1)},$$

where total number of pixels=text pixel count value+halftone dot pixel count value+other pixel count value; and parameter setting means for setting parameters for JPEG compression in accordance with the document discrimination signal,
where the parameter setting means for setting parameters for JPEG compression performs said setting by calculating with a following equation 2 parameters for setting values of AC components in a quantization table for JPEG compression at least based on the document discrimination signal;

$$AC\ \text{component}\ (i,j) = \text{default value}\ (i,j) \times (\text{document discrimination signal} \times (\alpha + \beta)) \quad \text{(Equation 2)},$$

where (i,j) are coordinates indicating a position in the quantization table,
the default value is an arbitrary quantization table, and $\alpha$ and $\beta$ are arbitrary real numbers and $\alpha<0$, $\beta>0$; and
JPEG compression means for setting parameters calculated by the parameter setting means to execute a JPEG compression process.

2. The image compressing apparatus as defined in claim 1, wherein if the document discrimination signal indicates that a document has a high proportion of a text area, the parameter setting means for setting parameters for JPEG compression further selects a subsampling of 4:1:1 and if it is indicated that a document has a low proportion of text area, selects a subsampling of 4:4:4, and if it is indicated that text and other areas are mixed on a document, selects a subsampling of 4:2:2 and sets parameters for switching respectively.

3. The image compressing apparatus as defined in claim 1, wherein if the document discrimination signal indicates that a document has a low proportion of text area, the parameter setting means for setting parameters for JPEG compression sets parameters for setting a DC component value in a quantization table to one.

4. An image reading apparatus provided with reading means for reading a document, comprising the image compressing apparatus as defined in any one of claims 1 to 3.

5. An image processing apparatus comprising:
the image compressing apparatus as defined in any one of claims 1-3;
storage means for storing the JPEG code output from the image compressing apparatus;
JPEG decompression means for reading, decoding and decompressing the JPEG code stored in the storage means into image data; and
subsequent stage image processing means for executing an image process for the image data decompressed by the JPEG decompression means.

6. An image forming apparatus comprising the image processing apparatus as defined in claim 5.

7. An image compression processing method to execute data compression for input document image data by JPEG compression, comprising:
a step of discriminating a document type that calculates with a following equation 1 a document discrimination signal indicating a proportion that a text area accounts for in one page of a document for the document image data;

$$\text{document discrimination signal} = (\text{text pixel count value} \div \text{total number of pixels}) \times 100 \quad \text{(Equation 1)}$$

where total number of pixels=text pixel count value+halftone dot pixel count value+other pixel count value; and a step of setting parameters for JPEG compression in accordance with the document discrimination signal, the step of setting the parameters calculates with a following equation 2 parameters for setting values of AC components in a quantization table JPEG compression at least based on the document discrimination signal;

$$AC\ component\ (i,j) = default\ value\ (i,j) \times (document\ discrimination\ signal\ \times (\alpha+\beta)) \quad \text{(Equation 2)},$$

where (i,j) are coordinates indicating a position in the quantization table, the default value is an arbitrary real numbers and $\alpha$ and $\beta$ are arbitrary real numbers and $\alpha<0$, $\beta>0$; and a step of executing a JPEG compression process using the parameters calculated by the equation 2.

8. The image compression processing method as defined in claim 7, wherein if the document discrimination signal indicates that a document has a high proportion of a text area, the step of setting the parameters further includes a step of selecting a subsampling of 4:1:1, and if it is indicated that a document has a low proportion of a text area, selecting a subsampling of 4:4:4, and if it is indicated that text and other areas are mixed on a document, selecting a subsampling of 4:2:2 and setting parameters for switching respectively.

9. The image compression processing method as defined in claim 7, wherein if the document discrimination signal indicates that a document has a low proportion of text area, the step of setting the parameters includes a step of setting parameters for setting a DC component value in a quantization table to one.

10. A non-transitory computer-readable storage medium having recorded thereon a computer-readable program operable to drive a computer to execute the image compression processing method as defined in any one of claims 7 to 9.

* * * * *